US012576465B2

(12) United States Patent (10) Patent No.: US 12,576,465 B2
Isono et al. (45) Date of Patent: Mar. 17, 2026

(54) FLUX-CORED WIRE

(71) Applicant: KOBE STEEL, LTD., Kobe (JP)

(72) Inventors: Shinya Isono, Fujisawa (JP); Hideaki Takauchi, Fujisawa (JP)

(73) Assignee: KOBE STEEL, LTD., Kobe (JP)

( * ) Notice: Subject to any disclaimer, the term of this patent is extended or adjusted under 35 U.S.C. 154(b) by 345 days.

(21) Appl. No.: 18/264,609

(22) PCT Filed: Jan. 11, 2022

(86) PCT No.: PCT/JP2022/000522
§ 371 (c)(1),
(2) Date: Aug. 8, 2023

(87) PCT Pub. No.: WO2022/172666
PCT Pub. Date: Aug. 18, 2022

(65) Prior Publication Data
US 2024/0300056 A1 Sep. 12, 2024

(30) Foreign Application Priority Data

Feb. 15, 2021 (JP) ................................. 2021-021936

(51) Int. Cl.
| | |
|---|---|
| *B23K 35/02* | (2006.01) |
| *B23K 35/30* | (2006.01) |
| *B23K 35/368* | (2006.01) |
| *C22C 38/00* | (2006.01) |
| *C22C 38/04* | (2006.01) |
| *C22C 38/44* | (2006.01) |
| *C22C 38/46* | (2006.01) |
| *C22C 38/48* | (2006.01) |
| *C22C 38/52* | (2006.01) |

(52) U.S. Cl.
CPC ...... *B23K 35/3086* (2013.01); *B23K 35/0266* (2013.01); *B23K 35/368* (2013.01); *C22C 38/001* (2013.01); *C22C 38/002* (2013.01); *C22C 38/04* (2013.01); *C22C 38/44* (2013.01); *C22C 38/46* (2013.01); *C22C 38/48* (2013.01); *C22C 38/52* (2013.01)

(58) Field of Classification Search
None
See application file for complete search history.

(56) References Cited

U.S. PATENT DOCUMENTS

2018/0272477 A1 9/2018 Sasaki et al.

FOREIGN PATENT DOCUMENTS

| | | | |
|---|---|---|---|
| CN | 103878501 A | | 6/2014 |
| CN | 106794558 A | | 5/2017 |
| CN | 111629859 A | | 9/2020 |
| EP | 3 378 594 A1 | | 9/2018 |
| JP | 11-207490 A | | 8/1999 |
| JP | 2019-48324 A | | 3/2019 |
| JP | 2019048324 A | * | 3/2019 |
| JP | 2020-121335 A | | 8/2020 |
| KR | 1999-015625 A | | 3/1999 |
| KR | 10-2017-0094625 A | | 8/2017 |
| KR | 10-2017-0097134 A | | 8/2017 |
| KR | 10-2018-0016569 A | | 2/2018 |
| KR | 10-2018-0108730 A | | 10/2018 |

OTHER PUBLICATIONS

Extended European Search Report issued Apr. 26, 2024 in European Patent Application No. 22752499.8, 10 pages.
Schuler, M. et al., "Creep investigation and simulation of CB2 joints using similar rutile CB2 flux-cored wire," Welding in the World, vol. 58, No. 6, Nov. 1, 2014, XP001593129, pp. 903-913.
International Search Report mailed on Mar. 29, 2022 in PCT/JP2022/000522 filed on Jan. 11, 2022.

* cited by examiner

*Primary Examiner* — Jenny R Wu
(74) *Attorney, Agent, or Firm* — Oblon, McClelland, Maier & Neustadt, L.L.P.

(57) ABSTRACT

A flux-cored wire for gas-shielded arc welding in which a steel sheath is filled with flux and the flux-cored wire contains Fe, C, Mn, Cr, Ni, Mo, Nb, V, P, and S within controlled amounts, and further contains, with respect to the total mass of the wire, $TiO_2$: 3.0 mass % or more and 9.0 mass % or less, a $SiO_2$ conversion value of metal Si and a Si compound: 0.5 mass % or more and 1.5 mass % or less, Co: 0.10 mass % or more and 1.50 mass % or less, N: 0.015 mass % or more and 0.060 mass % or less, Li: 0.11 mass % or less, Mg: 0.85 mass % or less, and a total amount of K and Na: 0.3 mass % or less.

20 Claims, No Drawings

FLUX-CORED WIRE

CROSS REFERENCE TO RELATED APPLICATIONS

This application is a National Stage entry under 35 U.S.C. § 371 of PCT/JP2022/000522, filed on Jan. 11, 2022, and claims priority to Japanese Patent Application No. 2021-021936, filed on Feb. 15, 2021, the entire contents of which are incorporated herein by reference.

TECHNICAL FIELD

The present invention relates to a flux-cored wire.

BACKGROUND ART

In general, 9% Cr steel is excellent in high temperature properties and is used for boilers, pressure vessels, and the like for thermal power generation and nuclear power generation. As such a wire for gas-shielded arc welding for manufacturing a welded structure, in recent years, there is an increasing demand for flux-cored wires that enable weld metals with better mechanical performance to be obtained.

For example, Patent Literature 1 discloses a flux-cored wire, in which a stainless steel sheath having a Cr content of 11 wt. % to 13.5 wt. % is filled with flux, and contents of other components such as Ni and Mn are specified within predetermined ranges.

CITATION LIST

Patent Literature

Patent Literature 1: JPH11-207490A

SUMMARY OF INVENTION

Technical Problem

However, 9% Cr steel has high hardenability during quenching, and in a state of as-welded, both a heat affected zone and a weld metal have a martensite structure, and a joint performance thereof deteriorates. Therefore, for the purpose of removing welding residual stress and residual hydrogen in a weld, softening the weld heat affected zone due to tempered martensitic structure of the weld, improving ductility and toughness of the weld, and the like, generally, post weld heat treatment (PWHT) is applied to the weld.

From the viewpoint of removing the residual stress, a higher PWHT temperature is more advantageous, but when PWHT is performed under a temperature exceeding an $A_{C1}$ transformation point of a weld metal, the weld metal undergoes phase transformation, and there is a risk that a creep rupture strength deteriorates significantly. In the American Welding Society standards and EN standards, there is a movement to regulate an upper limit of a total content of Mn and Ni for the purpose of increasing the $A_{C1}$ transformation point of the weld metal. Since there is a negative correlation between the $A_{C1}$ transformation point and the total content of Mn and Ni, when the content of these elements is high, application of high temperature PWHT is not suitable. Even when the flux-cored wire described in Patent Literature 1 is used, the weld metal after PWHT may not obtain a desired strength, especially when PWHT is performed at a high temperature such as 760° C. Patent Literature 1 does not disclose slag components, and there is room for improvement in weldability when performing welding in various welding positions.

The present invention is made in view of the above-described circumstances, and an object of the present invention is to provide a flux-cored wire for gas-shielded arc welding, which is suitably used for welding 9% Cr steel, can provide a weld metal having excellent strength and toughness even when the PWHT temperature is as high as 760° C., and has good weldability.

Solution to Problem

As a result of intensive studies on flux-cored wires for improving the strength and toughness after PWHT, present inventors found that by containing Co in the flux-cored wire and setting each component within a predetermined range, it is possible to reduce residual δ-ferrite and improve the toughness of the weld metal. Furthermore, as a result of intensive studies for all welding positions, it was found that by setting the slag components such as $TiO_2$, Na, and K within predetermined ranges, good weldability can be obtained even in various welding positions.

The present invention is made based on these findings.

The above object of the present invention is achieved by the following configuration [1] according to the flux-cored wire.

[1] A flux-cored wire for gas-shielded arc welding, in which a steel sheath is filled with flux, and the flux-cored wire contains, based on a total mass of the wire:
Fe: 75 mass % or more and 85 mass % or less;
C: 0.05 mass % or more and 0.25 mass % or less;
$TiO_2$: 3.0 mass % or more and 9.0 mass % or less;
a $SiO_2$ conversion value of metal Si and a Si compound: 0.5 mass % or more and 1.5 mass % or less;
Mn: 0.5 mass % or more and 2.0 mass % or less;
Cr: 8.0 mass % or more and 11.0 mass % or less;
Ni: 0.05 mass % or more and 1.0 mass % or less;
Mo: 0.7 mass % or more and 1.5 mass % or less;
Co: 0.10 mass % or more and 1.50 mass % or less;
Nb: 0.01 mass % or more and 0.15 mass % or less;
V: 0.1 mass % or more and 0.5 mass % or less;
N: 0.015 mass % or more and 0.060 mass % or less;
Li: 0.11 mass % or less;
Mg: 0.85 mass % or less;
a total amount of K and Na: 0.3 mass % or less;
P: 0.020 mass % or less; and
S: 0.020 mass % or less.
Preferred embodiments of the present invention according to the flux-cored wire relate to the following [2] to [5].
[2] The flux-cored wire according to [1], further containing, based on the total mass of the wire:
Li: 0.01 mass % or more and 0.11 mass % or less, in which
when a content of $TiO_2$ in the wire is expressed as $[TiO_2]$ in mass % based on the total mass of the wire, and a content of Li in the wire is expressed as [Li] in mass % based on the total mass of the wire, $[TiO_2]/[Li]$: 70 or more and 170 or less.
[3] The flux-cored wire according to [1] or [2], further containing, based on the total mass of the wire:
F: 0.10 mass % or more and 0.60 mass % or less.
[4] The flux-cored wire according to any one of [1] to [3], further containing, based on the total mass of the wire:
at least one selected from $Al_2O_3$, metal Zr, and a Zr compound in a range of 0.50 mass % or less of $Al_2O_3$ and 0.50 mass % or less of a $ZrO_2$ conversion value of metal Zr and a Zr compound.

[5] The flux-cored wire according to any one of [1] to [4], further containing, based on the total mass of the wire: metal Al: 0.20 mass % or less.

Advantageous Effects of Invention

According to the present invention, it is possible to provide a flux-cored wire for gas-shielded arc welding, which is capable of obtaining a weld metal having excellent strength and toughness even when PWHT temperature is as high as, for example, 760° C., and has good weldability.

DESCRIPTION OF EMBODIMENTS

Hereinafter, an embodiment of the present invention will be described in detail. Note that the present invention is not limited to the embodiment described below, and can be optionally modified and implemented without departing from the gist of the present invention.

[1. Flux-Cored Wire]

In a flux-cored wire (hereinafter also simply referred to as "wire") according to the present embodiment, a steel sheath is filled with flux. The flux-cored wire according to the present embodiment is a wire for gas-shielded arc welding of so-called low-alloy steel plates, and can be particularly suitably used for gas-shielded arc welding of 9% Cr steel plates.

Hereinafter, reasons for inclusion and reasons for limiting numerical ranges of components contained in the flux-cored wire according to the present embodiment will be described.

Note that in the following description, unless otherwise specified, an amount of each component in the flux-cored wire is defined as a content based on a total mass of the wire, that is, a total amount of the sheath and the flux in the sheath.

<Fe: 75 Mass % or More and 85 Mass % or Less>

Fe is a main component of the wire according to the present embodiment.

A Fe content based on the total mass of the wire is 75 mass % or more, and may be 76 mass % or more or 77 mass % or more. The Fe content based on the total mass of the wire is 85 mass % or less, and may be 84 mass % or less or 82 mass % or less.

<C: 0.05 Mass % or More and 0.25 Mass % or Less>

C is an important element that combines with Cr, Mo, V, and Nb to precipitate carbides and has an effect of ensuring strength of weld metal.

If a C content is less than 0.05 mass % based on the total mass of the wire, desired strength of the weld metal cannot be obtained. Therefore, the C content based on the total mass of the wire is 0.05 mass % or more, preferably 0.07 mass % or more, and more preferably 0.09 mass % or more.

On the other hand, if the C content based on the total mass of the wire exceeds 0.25 mass %, a solidification temperature of a segregation portion is greatly lowered, and hot cracks are likely to occur. Precipitation of carbides becomes excessive and toughness of the weld metal is lowered. Therefore, the C content based on the total mass of the wire is 0.25 mass % or less, preferably 0.23 mass % or less, and more preferably 0.21 mass % or less.

<$TiO_2$: 3.0 Mass % or More and 9.0 Mass % or Less>

$TiO_2$ is a component that is added to the wire as a slag forming agent, and is a component that has an effect of improving vertical upward weldability.

If a $TiO_2$ content based on the total mass of the wire is less than 3.0 mass %, encapsulation of the slag deteriorates.

Therefore, the $TiO_2$ content based on the total mass of the wire is 3.0 mass % or more, preferably 4.0 mass % or more, and more preferably 4.5 mass % or more.

On the other hand, if the $TiO_2$ content based on the total mass of the wire exceeds 9.0 mass %, an amount of slag generated becomes excessive, and slag entrainment is likely to occur in a weld. An amount of oxygen in the weld metal increases and the toughness deteriorates. Furthermore, excessive content of Ti in $TiO_2$ in the weld metal results in excessive tensile strength and reduced toughness. Therefore, the $TiO_2$ content based on the total mass of the wire is 9.0 mass % or less, preferably 8.5 mass % or less, and more preferably 8.0 mass % or less.

Note that in the present embodiment, the $TiO_2$ content is a $TiO_2$ conversion value of a Ti compound. More specifically, the $TiO_2$ content is a value obtained by converting all Ti that is insoluble in acid into $TiO_2$.

<$SiO_2$ Conversion Value of Metal Si and Si Compound: 0.5 Mass % or More and 1.5 Mass % or Less>

Si is an element that functions as a deoxidizing agent for the weld metal and has an effect of reducing an oxygen content of the weld metal, and has an effect of improving slag viscosity, thereby improving the slag encapsulation and weld toe conformability.

If a $SiO_2$ conversion value based on the total mass of the wire is less than 0.5 mass %, the above effects cannot be sufficiently obtained, and bead appearance and bead shape deteriorate. Therefore, the $SiO_2$ conversion value based on the total mass of the wire is 0.5 mass % or more, preferably 0.55 mass % or more, and more preferably 0.6 mass % or more.

On the other hand, if the $SiO_2$ conversion value based on the total mass of the wire exceeds 1.5 mass %, the slag entrainment is likely to occur in the weld. Si is a ferrite-forming element, and if added excessively, it causes residual δ-ferrite, which lowers the toughness of the weld metal. Therefore, the $SiO_2$ conversion value based on the total mass of the wire is 1.5 mass % or less, preferably 1.4 mass % or less, and more preferably 1.3 mass % or less.

Note that in the present embodiment, the $SiO_2$ conversion value is defined as a $SiO_2$ conversion value obtained by converting all Si contained in simple Si, Si alloys, and Si compounds (excluding Si compounds in alloys) contained in the wire to $SiO_2$.

<Mn: 0.5 Mass % or More and 2.0 Mass % or Less>

Mn is an element that functions as a deoxidizing agent for the weld metal and has an effect of improving the strength and toughness of the weld metal. Mn is an austenite-forming element, and is also an element that has an effect of preventing deterioration in toughness due to residual δ-ferrite in the weld metal.

If a Mn content based on the total mass of the wire is less than 0.5 mass %, insufficient deoxidation is caused and the effect of reducing residual δ-ferrite cannot be sufficiently obtained, resulting in a decrease in the toughness of the weld metal. Therefore, the Mn content based on the total mass of the wire is 0.5 mass % or more, preferably 0.7 mass % or more, and more preferably 0.8 mass % or more.

On the other hand, if the Mn content based on the total mass of the wire exceeds 2.0 mass %, high temperature strength of the weld metal deteriorates. The solidification temperature of the segregation portion is lowered, and a transformation point is also lowered, which makes it difficult to perform PWHT at a high temperature. Therefore, the Mn content based on the total mass of the wire is 2.0 mass % or less, preferably 1.8 mass % or less, and more preferably 1.6 mass % or less.

5

<Cr: 8.0 Mass % or More and 11.0 Mass % or Less>

Cr is a main element of 9Cr steel at which the flux-cored wire according to the present embodiment target, and is an indispensable element for ensuring oxidation resistance and high temperature strength of the weld metal.

If a Cr content based on the total mass of the wire is less than 8.0 mass %, the oxidation resistance and high temperature strength are insufficient. Therefore, the Cr content based on the total mass of the wire is 8.0 mass % or more, preferably 8.3 mass % or more, and more preferably 8.5 mass % or more.

On the other hand, since Cr is a ferrite-forming element, if the Cr content based on the total mass of the wire exceeds 11.0 mass %, residual δ-ferrite will be caused, and the toughness and creep performance of the weld metal will deteriorate. Therefore, the Cr content based on the total mass of the wire is 11.0 mass % or less, preferably 10.5 mass % or less, and more preferably 10.0 mass % or less.

<Ni: 0.05 Mass % or More and 1.0 Mass % or Less>

As Mn, Ni is also an austenite-forming element, and is an element that has an effect of reducing residual δ-ferrite in the weld metal and improving the toughness.

If a Ni content based on the total mass of the wire is less than 0.05 mass %, the effect of improving the toughness of the weld metal cannot be sufficiently obtained. Therefore, the Ni content based on the total mass of the wire is 0.05 mass % or more, preferably 0.1 mass % or more, and more preferably 0.2 mass % or more.

On the other hand, if the Ni content based on the total mass of the wire exceeds 1.0 mass %, the high temperature strength is lowered and the transformation point is lowered, which makes it difficult to perform PWHT at a high temperature. Therefore, the Ni content based on the total mass of the wire is 1.0 mass % or less, preferably 0.8 mass % or less, and more preferably 0.7 mass % or less.

<Total Amount of Mn and Ni: 0.7 Mass % or More and 2.5 Mass % or Less>

As described above, both Mn and Ni are elements that have the effect of reducing the residual δ-ferrite in the weld metal and improving the toughness, and by appropriately controlling a total amount of these elements, it is possible to prevent a decrease in the transformation point and perform PWHT at an envisioned temperature. Therefore, the total amount of Mn and Ni based on the total mass of the wire is preferably 0.7 mass % or more, and more preferably 0.9 mass % or more. The total amount of Mn and Ni based on the total mass of the wire is preferably 2.5 mass % or less, and more preferably 2.2 mass % or less.

<Mo: 0.7 Mass % or More and 1.5 Mass % or Less>

Mo is a solid-solution hardening element and is an element having an effect of improving creep rupture strength.

If a Mo content based on the total mass of the wire is less than 0.7 mass %, the desired creep rupture strength cannot be obtained. Therefore, the Mo content based on the total mass of the wire is 0.7 mass % or more, preferably 0.75 mass % or more, and more preferably 0.8 mass % or more.

On the other hand, if the Mo content based on the total mass of the wire exceeds 1.5 mass %, residual δ-ferrite will be caused, and the toughness and creep performance of the weld metal will deteriorate. Therefore, the Mo content based on the total mass of the wire is 1.5 mass % or less, preferably 1.3 mass % or less, and more preferably 1.1 mass % or less.

<Co: 0.10 Mass % or More and 1.50 Mass % or Less>

Co is an austenite-forming element, and is an element that has an effect of reducing the residual δ-ferrite. By including Mn or Ni in the wire, the effect of reducing the residual δ-ferrite can also be obtained, but as compared with Mn and Ni, Co has a smaller reduction in the transformation point, so that PWHT can be performed at a high temperature, and the toughness of the weld metal can be improved more effectively, and the creep strength can be improved.

If a Co content based on the total mass of the wire is less than 0.10 mass %, the effect of improving the toughness cannot be sufficiently obtained. Therefore, the Co content based on the total mass of the wire is 0.10 mass % or more, preferably 0.12 mass % or more, more preferably 0.15 mass % or more, still more preferably 0.20 mass % or more, and particularly preferably 0.25 mass % or more.

On the other hand, if the Co content based on the total mass of the wire exceeds 1.50 mass %, the transformation point is lowered and PWHT at a high temperature becomes difficult. Since Co is an expensive material, a raw material cost of the wire increases. Therefore, the Co content based on the total mass of the wire is 1.50 mass % or less, preferably 1.20 mass % or less, more preferably 1.00 mass % or less, still more preferably 0.70 mass % or less, and particularly preferably 0.50 mass % or less.

<Nb: 0.01 Mass % or More and 0.15 Mass % or Less>

Nb is an element that has the effect of improving the strength of the weld metal through solid-solution hardening, and also has an effect of contributing to stabilization of the creep rupture strength by being precipitated as a nitride.

If the Nb content based on the total mass of the wire is less than 0.01 mass %, the effect of improving the strength of the weld metal and the effect of stabilizing the creep rupture strength cannot be sufficiently obtained. Therefore, the Nb content based on the total mass of the wire is 0.01 mass % or more, preferably 0.015 mass % or more, and more preferably 0.02 mass % or more.

On the other hand, if the Nb content based on the total mass of the wire exceeds 0.15 mass %, residual δ-ferrite will be caused, and the toughness of the weld metal will be lowered, and the creep performance will deteriorate. Therefore, the Nb content based on the total mass of the wire is 0.15 mass % or less, preferably 0.12 mass % or less, and more preferably 0.10 mass % or less.

<V: 0.1 Mass % or More and 0.5 Mass % or Less>

V is an element that precipitates in the weld metal as a carbonitride and has the effect of stabilizing the creep rupture strength by precipitation strengthening.

If a V content based on the total mass of the wire is less than 0.1 mass %, the desired creep rupture strength cannot be obtained. Therefore, the V content based on the total mass of the wire is 0.1 mass % or more, preferably 0.15 mass % or more, and more preferably 0.17 mass % or more.

On the other hand, if the V content based on the total mass of the wire exceeds 0.5 mass %, residual δ-ferrite will be caused, and the toughness of the weld metal will be lowered, and the creep performance will deteriorate. Therefore, the V content based on the total mass of the wire is 0.5 mass % or less, preferably 0.4 mass % or less, and more preferably 0.3 mass % or less.

<N: 0.015 Mass % or More and 0.060 Mass % or Less>

N is an element that has the effect of improving the strength of the weld metal through solid-solution hardening, and also has the effect of contributing to stabilization of the creep rupture strength by being precipitated as a nitride.

If a N content based on the total mass of the wire is less than 0.015 mass %, the effect of improving the strength of the weld metal and the effect of stabilizing the creep rupture strength cannot be sufficiently obtained. Therefore, the N content based on the total mass of the wire is 0.015 mass % or more, preferably 0.018 mass % or more, and more preferably 0.020 mass % or more.

On the other hand, if the N content based on the total mass of the wire is excessive, N cannot form a solid solution in the weld metal, which results in blowholes. Therefore, the N content based on the total mass of the wire is 0.060 mass % or less, preferably 0.050 mass % or less, and more preferably 0.040 mass % or less.

<Li: 0.11 Mass % or Less (Including 0 Mass %)>

Li is an element that has an effect of reducing remaining of alloy elements in the wire to the weld metal. In the flux-cored wire according to the present embodiment, since the $TiO_2$ content as a slag forming agent is large, the Ti content in the weld metal tends to increase. Therefore, by containing Li in the wire, it is possible to prevent excessive remaining of Ti and excessive increase in strength, and improve the toughness.

In the present embodiment, a lower limit of a Li content is not particularly limited and may be 0 mass %, but when Li is contained in the wire for the purpose of preventing the excessive remaining of $TiO_2$, the Li content based on the total mass of the wire is preferably 0.02 mass % or more, and is more preferably 0.03 mass % or more.

On the other hand, if the Li content based on the total mass of the wire exceeds 0.11 mass %, the amount of Ti in the weld metal decreases, and the tensile strength of the weld metal decreases. Since the slag viscosity is lowered, the vertical weldability is significantly deteriorated. Therefore, the Li content based on the total mass of the wire is 0.11 mass % or less, preferably 0.09 mass % or less, and more preferably 0.07 mass % or less.

<Mg: 0.85 Mass % or Less (Including 0 Mass %)>

Mg is an element that has a deoxidizing effect and contributes to stabilizing the toughness of the weld metal.

In the present embodiment, a lower limit of a Mg content is not particularly limited, and may be 0 mass %, and if Mg is contained in the wire for the purpose of adjusting the toughness of the weld metal to a desired range, the Mg content based on the total mass of the wire may be 0.1 mass % or more or 0.2 mass % or more.

On the other hand, if the Mg content based on the total mass of the wire exceeds 0.85 mass %, the remaining of alloy elements to the weld metal increases, which results in an excessive increase in strength. A spatter generation amount increases, and the weldability becomes poor. Therefore, the Mg content based on the total mass of the wire is 0.85 mass % or less, preferably 0.70 mass % or less, and more preferably 0.65 mass % or less.

<Total Amount of K and Na: 0.3 Mass % or Less (Including 0 Mass %)>

K and Na are components that have an effect of stabilizing arc, and by adding K and Na to the wire in an appropriate amount, a good bead shape can be obtained.

In the present embodiment, a lower limit of a total amount of K and Na is not particularly limited, and may be 0 mass %, and if one or both of K and Na are contained in the wire for the purpose of further stabilizing the arc, the total amount of K and Na based on the total mass of the wire is preferably 0.03 mass % or more, and more preferably 0.05 mass % or more.

On the other hand, if the total amount of K and Na exceeds 0.3 mass % based on the total mass of the wire, the toughness of the weld metal is lowered. Therefore, the total amount of K and Na based on the total mass of the wire is 0.3 mass % or less, preferably 0.2 mass % or less, and more preferably 0.15 mass % or less.

Note that the wire according to the present embodiment may contain both K and Na, or may contain only one of K and Na, as long as the total amount thereof is within the above range.

<P: 0.020 Mass % or Less (Including 0 Mass %)>

P is an element that increases hot crack susceptibility.

If a P content based on the total mass of the wire exceeds 0.020 mass %, hot crack will occur. Therefore, the P content based on the total mass of the wire is 0.020 mass % or less, preferably 0.015 mass % or less, and more preferably 0.012 mass % or less.

<S: 0.020 Mass % or Less (Including 0 Mass %)>

S is an element that increases the hot crack susceptibility.

If a S content based on the total mass of the wire exceeds 0.020 mass %, hot crack will occur. Therefore, the S content based on the total mass of the wire is 0.020 mass % or less, preferably 0.018 mass % or less, and more preferably 0.015 mass % or less.

Note that in the wire according to the present embodiment, it is preferable that the Li content is 0.01 mass % or more and 0.11 mass % or less and a ratio of $TiO_2$ content to Li content in the wire is properly controlled.

<$[TiO_2]/[Li]$. 70 or More and 170 or Less>

In the present embodiment, $TiO_2$ is contained in the wire in order to improve workability in all welding positions, but when Ti in $TiO_2$ is contained in the weld metal, the tensile strength becomes excessive and the toughness decreases. As described above, Li has the effect of reducing the remaining of Ti to the weld metal, but an excessive Li content in the wire causes a decrease in the tensile strength. Therefore, it is preferable to set the Li content within a predetermined range, and control by the $TiO_2$ content. That is, by controlling the ratio of the $TiO_2$ content to the Li content within a predetermined range, it is possible to improve a balance between the strength and the toughness of the weld metal.

The upper limit of the Li content is as described above, but in order to improve the balance between the strength and the toughness of the weld metal, when controlling the ratio of the $TiO_2$ content to the Li content, the Li content based on the total mass of the wire is preferably 0.01 mass % or more.

When the $TiO_2$ content in the wire is expressed as $[TiO_2]$ in mass % based on the total mass of the wire, and the Li content in the wire is expressed as $[Li]$ in mass % based on the total mass of the wire, if a value obtained from a formula ($[TiO_2]/[Li]$) is 70 or more, the decrease in the tensile strength can be prevented. Therefore, the value obtained from the formula ($[TiO_2]/[Li]$) is preferably 70 or more, more preferably 75 or more, and still more preferably 80 or more.

On the other hand, if the value obtained from the formula ($[TiO_2]/[Li]$) is 170 or less, it is possible to prevent the decrease in the toughness. Therefore, the value obtained from the formula ($[TiO_2]/[Li]$) is preferably 170 or less, more preferably 160 or less, and still more preferably 150 or less.

The wire according to the present embodiment preferably further contains F (fluoride) within the following content range. A reason for limiting the content of F contained in the wire will be described below.

<F: 0.10 Mass % or More and 0.60 Mass % or Less>

Although F is not an essential component in the wire of the present embodiment, it is an element that has an effect of reducing an amount of diffusible hydrogen in the weld metal, and F can be contained in the wire as an optional component.

If a F content based on the total mass of the wire is 0.10 mass % or more, the amount of diffusible hydrogen can be reduced, and occurrence of crack can be prevented. Therefore, when F is contained in the wire, the F content based on the total mass of the wire is preferably 0.10 mass % or more, more preferably 0.15 mass % or more, still more preferably 0.17 mass % or more, and particularly preferably 0.20 mass % or more.

On the other hand, if the F content based on the total mass of the wire is 0.60 mass % or less, an increase in spatter can be prevented, and the arc can be stabilized. Therefore, when F is contained in the wire, the F content based on the total mass of the wire is preferably 0.60 mass % or less, more preferably 0.55 mass % or less, and still more preferably 0.50 mass % or less.

Furthermore, the wire according to the present embodiment preferably contains at least one selected from $Al_2O_3$, metal Zr and Zr compounds within respective content ranges shown below. Reasons for limiting the contents of these components in the wire will be described below.

<$Al_2O_3$: 0.50 Mass % or Less>

$Al_2O_3$ is a slag forming agent and is not an essential component in the wire of the present embodiment, but can improve the bead shape, and therefore, $Al_2O_3$ can be contained in the wire as an optional component.

When $Al_2O_3$ is contained in the wire, an $Al_2O_3$ content based on the total mass of the wire is preferably 0.02 mass % or more, and more preferably 0.03 mass % or more. On the other hand, if the $Al_2O_3$ content based on the total mass of the wire is 0.50 mass % or less, good slag removability can be obtained. Therefore, when $Al_2O_3$ is contained in the wire, the $Al_2O_3$ content based on the total mass of the wire is preferably 0.50 mass % or less, more preferably 0.40 mass % or less, and still more preferably 0.30 mass % or less.

Note that in the present embodiment, the $Al_2O_3$ content is an $Al_2O_3$ conversion value of an Al compound. More specifically, the $Al_2O_3$ content is a value obtained by converting all Al insoluble in acid into $Al_2O_3$.

<$ZrO_2$ Conversion Value of Metal Zr and Zr Compound: 0.50 Mass % or Less>

$ZrO_2$ is a component that has the deoxidizing effect and is not an essential component in the wire of the present embodiment, but can improve a bead toe shape, and therefore, $ZrO_2$ can be contained in the wire as an optional component.

When $ZrO_2$ is contained in the wire, a $ZrO_2$ content based on the total mass of the wire is preferably 0.05 mass % or more, and more preferably 0.07 mass % or more. On the other hand, if the $ZrO_2$ content based on the total mass of the wire is 0.50 mass % or less, fluidity of the slag can be properly maintained. Therefore, when $ZrO_2$ is contained in the wire, the $ZrO_2$ content based on the total mass of the wire is preferably 0.50 mass % or less, more preferably 0.35 mass % or less, and still more preferably 0.30 mass % or less.

Note that in the present embodiment, a $ZrO_2$ conversion value represents a $ZrO_2$ conversion value obtained by converting all Zr derived from metal Zr and Zr compounds contained in the wire into $ZrO_2$, the metal Zr including single Zr and Zr alloy.

Furthermore, the wire according to the present embodiment preferably contains metal Al within the following content range. A reason for limiting the content of metal Al contained in the wire will be described below.

<Metal Al: 0.20 Mass % or Less>

Metal Al is a component that has the deoxidizing effect and is not an essential component in the wire of the present embodiment, but can stabilize the toughness of the weld metal, and therefore, metal Al can be contained in the wire as an optional component.

When metal Al is contained in the wire, a metal Al content based on the total mass of the wire is preferably 0.01 mass % or more, and more preferably 0.02 mass % or more.

On the other hand, if the metal Al content based on the total mass of the wire is 0.20 mass % or less, the remaining of the alloy element to the weld metal can be appropriately adjusted, and an excessive increase in strength can be prevented. Therefore, when the metal Al is contained in the wire, the metal Al content based on the total mass of the wire is preferably 0.20 mass % or less, more preferably 0.12 mass % or less, and still more preferably 0.10 mass % or less.

Note that in the present embodiment, the metal Al content is a total amount of Al contained in simple Al and Al alloy.

<Remainder>

The flux-cored wire according to the present embodiment contains unavoidable impurities in a range of 1.5 mass % or less based on the total mass of the wire as a remainder of the components other than the above. The remainder of the wire may contain Cu, Ca, W, B, and the like.

The flux-cored wire according to the present embodiment may contain, for example, Cu: 0.30 mass % or less, Ca: 0.05 mass % or less, W: 0.1 mass % or less, and B: 0.05 mass % or less. The metal Ti may be contained in an amount of 0.20 mass % or less, 0.10 mass % or less, 0.05 mass % or less, or 0.01 mass % or less. Here, the metal Ti is a single Ti or Ti alloy, and means a content of Ti soluble in acid.

The flux-cored wire according to the present embodiment contains the above Fe, C, $TiO_2$, the $SiO_2$ conversion value, Mn, Cr, Ni, Mo, Co, Nb, V, N, Li, Mg, the total amount of K and Na, P, and S, based on the total mass of the wire, in a total amount of preferably 90 mass % or more, more preferably 93 mass % or more, still more preferably 96 mass % or more, and particularly preferably 98 mass % or more.

An outer diameter of the flux-cored wire in the present embodiment is not particularly limited, and is preferably 0.9 mm or more and 1.6 mm or less, for example.

A flux filling rate of the flux-cored wire in the present embodiment can be set to any value as long as the content of each element in the wire is within the range of the present invention. From the viewpoint of wire drawability and wire feedability during wire manufacture, the flux filling rate is preferably 15 mass % or more and 25 mass % or less based on the total mass of the wire, for example.

The flux-cored wire according to the present embodiment may or may not have a seam on the sheath, and there are no restrictions on the shape of the seam or the shape of a cross section thereof.

The flux-cored wire in the present embodiment can be used for gas-shielded arc welding using, for example, a mixed gas of 80 volume % Ar and 20 volume % $CO_2$ as a shielding gas.

[2. Method for Manufacturing Flux-Cored Wire]

The method for manufacturing the flux-cored wire according to the present embodiment is not particularly limited, and for example, the flux-cored wire can be manufactured by the method shown below.

First, a steel strip constituting the steel sheath is prepared, and the steel strip is molded by forming rolls while being fed in a longitudinal direction to form a U-shaped open pipe. Next, the steel sheath is filled with a flux containing various raw materials so as to have a predetermined composition, and then processed to have a circular cross section. Then, wire drawing is performed by cold working to obtain the flux-cored wire according to the present embodiment.

Note that annealing may be performed during the cold working. Either a seamless wire in which the seam of the steel sheath formed during the manufacturing process is welded, or a wire in which the seam is not welded but left as a gap can be adopted.

EXAMPLES

Hereinafter, effects of the present invention will be specifically described with reference to inventive examples and comparative examples according to the present embodiment, but the present invention is not limited thereto.

Flux-cored wires with a diameter of 1.2 mm were produced so that the components of the wires have various contents.

<Evaluation of Amount of Diffusible Hydrogen>

The gas-shielded arc welding was performed using the produced flux-cored wires under welding conditions for an amount of diffusible hydrogen evaluation test shown in Table 1 below, and the amount of diffusible hydrogen was measured according to the "Method for Measuring Amount of Hydrogen in Steel Weld" specified in JIS Z 3118:2007. Note that a wire protrusion length was set to 25 mm.

As evaluation criteria for the amount of diffusible hydrogen, 4 (ml/100 g) or less was rated as A (excellent), and exceeding 4 (ml/100 g) was rated as B (good).

<Evaluation of Mechanical Properties>

Metal active gas (MAG) welding was performed using the produced flux-cored wires under welding conditions for a mechanical property evaluation test shown in Table 1 below, and then PWHT was performed to prepare weld metal test bodies. The mechanical properties of the weld metal are determined according to the "Weld Metal Tension and Impact Test Method" specified in JIS Z 3111: 2005. A No. A2 tensile test piece was taken from the weld metal test body, and the "tensile strength" thereof is evaluated by a tensile test, and a V-notch test piece was taken from the weld metal test body, and the "toughness" was evaluated by the Charpy impact test at 20° C.

As evaluation criteria for mechanical properties, a tensile strength of 750 MPa or more was rated as A (excellent), a tensile strength of 700 MPa or more and less than 750 MPa was rated as B (good), and a tensile strength of less than 700 MPa was rated as C (bad).

Regarding the toughness, the Charpy impact value of 25 J or more at 20° C. was rated as A (excellent), the Charpy impact value of 20 J or more and less than 25 J was rated as B (good), and the Charpy impact value of less than 20 J was rated as C (bad).

<Evaluation of Weldability>

In order to evaluate the weldability, gas-shielded arc welding was performed using the flux-cored wires under welding conditions for a weldability evaluation test shown in Table 1 below. Note that in the present example, two kinds of welding positions of horizontal fillet welding and vertical upward fillet welding were used.

As evaluation criteria for the weldability, items of bead conformability, presence or absence of an extreme convex bead, an amount of spatter, and sagging were visually observed, and a wire that was excellent in all items was rated as A (excellent), a wire that was inferior in some items but could be used without problems was rated as B (good), and a wire that was difficult to use was rated as C (bad).

Tables 2 and 3 below show calculated values based on the component compositions and specific components of the produced wires, and Table 3 below also shows evaluation results.

Note that the components shown in "wire components" in Tables 2 and 3 contain Fe as a main component. The components of each wire are 99 mass % or more in total of the components listed in Tables 2 and 3 and Fe.

In Table 3, $[TiO_2]$ is a value representing the $TiO_2$ content in the wire in mass % based on the total mass of the wire, and [Li] is a value representing the Li content in the wire in mass % based on the total mass of the wire.

Furthermore, in the columns of wire components in Tables 2 and 3, "-" indicates that the corresponding component was not intentionally added during the manufacture of the wire. Furthermore, in the column of evaluation result in Table 3, "-" indicates that the corresponding evaluation test was not performed.

TABLE 1

| | | Welding condition | |
|---|---|---|---|
| | For mechanical property evaluation test | For weldability evaluation test | For diffusible hydrogen evaluation test |
| Steel type of base material | ASTM A387 Grade 91 Class 2 | JIS G 3106 SM490A | JIS G 3106 SM400B |
| Welding current | 240 A to 270 A | During horizontal fillet welding: 200 A 240 A to 270 A During vertical upward welding: 140 A to 200 A | |
| Arc voltage | 29 V to 32 V | During horizontal fillet welding: 25 V 29 V to 32 V During vertical upward welding: 22 V to 26 V | |
| Lamination method | 6 Layers to 7 Layers | 1 Pass | 1 Pass |
| Shielding gas composition | 80% Ar - 20% $CO_2$ Gas | 80% Ar - 20% $CO_2$ Gas | 80% Ar - 20% $CO_2$ Gas |
| Shielding gas flow rate | 25 Liters/min | 25 Liters/min | 25 Liters/min |
| PWHT | 760° C. × 2 Hours | — | — |

TABLE 2

| | Wire No. | C | TiO$_2$ | SiO$_2$ Conversion value | Mn | Cr | Ni | Mo | Co | Nb | V | N | Li | Mg | Total amount of K and Na | P | S |
|---|---|---|---|---|---|---|---|---|---|---|---|---|---|---|---|---|---|
| Inventive examples | 1 | 0.17 | 6.4 | 0.8 | 1.39 | 8.87 | 0.34 | 0.86 | 0.35 | 0.02 | 0.22 | 0.025 | 0.07 | — | 0.09 | 0.008 | 0.007 |
| | 2 | 0.19 | 6.5 | 0.7 | 0.91 | 8.76 | 0.56 | 0.86 | 0.35 | 0.03 | 0.23 | 0.025 | 0.05 | — | 0.09 | 0.007 | 0.007 |
| | 3 | 0.19 | 6.5 | 0.7 | 1.34 | 8.71 | 0.34 | 0.85 | 0.35 | 0.03 | 0.23 | 0.025 | 0.05 | — | 0.09 | 0.007 | 0.007 |
| | 4 | 0.20 | 6.5 | 0.7 | 1.43 | 8.87 | 0.34 | 0.80 | 0.35 | 0.02 | 0.20 | 0.025 | 0.07 | — | 0.09 | 0.007 | 0.007 |
| | 5 | 0.19 | 6.3 | 0.8 | 1.35 | 8.76 | 0.34 | 0.86 | 0.35 | 0.03 | 0.25 | 0.025 | 0.05 | — | 0.10 | 0.008 | 0.007 |
| | 6 | 0.19 | 6.5 | 0.7 | 1.35 | 8.76 | 0.34 | 0.86 | 0.35 | 0.03 | 0.23 | 0.025 | 0.05 | — | 0.09 | 0.007 | 0.007 |
| | 7 | 0.19 | 6.5 | 0.7 | 1.35 | 8.76 | 0.34 | 0.86 | 0.35 | 0.03 | 0.23 | 0.025 | 0.05 | — | 0.09 | 0.007 | 0.007 |
| | 8 | 0.12 | 7.8 | 1.3 | 1.10 | 8.41 | 0.32 | 0.75 | 0.32 | 0.04 | 0.22 | 0.030 | 0.05 | 0.84 | 0.09 | 0.006 | 0.004 |
| | 9 | 0.20 | 6.5 | 0.7 | 1.43 | 8.87 | 0.34 | 0.80 | 0.35 | 0.02 | 0.20 | 0.025 | 0.05 | 0.22 | 0.09 | 0.007 | 0.007 |
| | 10 | 0.20 | 6.5 | 0.7 | 1.43 | 8.87 | 0.34 | 0.80 | 0.35 | 0.02 | 0.20 | 0.025 | 0.05 | — | 0.09 | 0.007 | 0.007 |
| | 11 | 0.20 | 6.5 | 0.7 | 1.43 | 8.87 | 0.34 | 0.80 | 0.35 | 0.02 | 0.20 | 0.025 | 0.05 | 0.44 | 0.09 | 0.007 | 0.007 |
| | 12 | 0.20 | 6.5 | 0.7 | 1.43 | 8.87 | 0.34 | 0.80 | 0.35 | 0.02 | 0.20 | 0.025 | 0.05 | 0.66 | 0.09 | 0.007 | 0.007 |
| | 13 | 0.10 | 7.7 | 0.8 | 1.48 | 9.03 | 0.35 | 0.85 | 0.37 | 0.05 | 0.23 | 0.025 | 0.06 | 0.34 | 0.16 | 0.008 | 0.007 |
| | 14 | 0.10 | 7.7 | 0.8 | 1.48 | 9.03 | 0.35 | 0.85 | 0.37 | 0.05 | 0.23 | 0.025 | 0.06 | 0.34 | 0.16 | 0.008 | 0.007 |
| Comparative examples | 15 | 0.10 | 8.3 | 0.8 | 1.86 | 9.02 | 0.34 | 0.95 | 0.32 | 0.04 | 0.26 | 0.032 | 0.12 | — | 0.18 | 0.007 | 0.005 |
| | 16 | 0.10 | 7.5 | 0.7 | 1.86 | 9.02 | 0.42 | 0.95 | — | 0.04 | 0.26 | 0.032 | — | 0.81 | 0.18 | 0.007 | 0.004 |
| | 17 | 0.10 | 7.1 | 0.8 | 1.07 | 8.28 | 0.27 | 0.77 | 0.33 | 0.04 | 0.21 | 0.023 | 0.05 | 0.88 | 0.36 | 0.008 | 0.006 |
| | 18 | 0.10 | 7.1 | 0.8 | 1.07 | 8.28 | 0.27 | 0.77 | 0.33 | 0.04 | 0.21 | 0.023 | 0.05 | 0.88 | 0.25 | 0.008 | 0.006 |
| | 19 | 0.10 | 7.1 | 1.5 | 1.09 | 8.32 | 0.32 | 0.77 | 0.32 | 0.04 | 0.22 | 0.027 | 0.05 | 0.88 | 0.36 | 0.006 | 0.004 |
| | 20 | 0.15 | 6.9 | 0.8 | 1.14 | 8.10 | 0.27 | 0.80 | 0.33 | 0.03 | 0.20 | 0.038 | 0.05 | 0.88 | 0.10 | 0.008 | 0.007 |
| | 21 | 0.15 | 0.2 | 2.9 | 1.08 | 8.54 | 0.36 | 0.83 | 0.33 | 0.03 | 0.22 | 0.038 | — | 0.44 | 0.10 | 0.017 | 0.008 |
| | 22 | 0.16 | — | 1.0 | 0.78 | 8.54 | 0.36 | 0.83 | 0.33 | 0.03 | 0.22 | 0.039 | — | 0.44 | 0.10 | 0.009 | 0.007 |
| | 23 | 0.15 | 0.1 | 1.9 | 1.08 | 8.32 | 0.36 | 0.83 | 0.33 | 0.02 | 0.20 | 0.038 | — | 0.88 | 0.10 | 0.012 | 0.007 |
| | 24 | 0.15 | 0.8 | 1.9 | 1.08 | 8.32 | 0.36 | 0.83 | 0.33 | 0.02 | 0.20 | 0.038 | — | 0.88 | 0.10 | 0.012 | 0.007 |
| | 25 | 0.12 | 1.3 | 2.0 | 0.97 | 8.39 | 0.26 | 0.85 | 0.34 | 0.02 | 0.21 | 0.039 | — | 0.45 | 0.11 | 0.012 | 0.007 |
| | 26 | 0.11 | 7.7 | 0.8 | 1.15 | 9.03 | 0.30 | 0.84 | 0.36 | 0.05 | 0.23 | 0.024 | 0.05 | 0.96 | 0.27 | 0.008 | 0.007 |

TABLE 3

| | Wire No. | F | Al$_2$O$_3$ | ZrO$_2$ Conversion value | Metal Al | [TiO$_2$]/[Li] | Amount of diffusible hydrogen | Tensile strength | Toughness | Weldability |
|---|---|---|---|---|---|---|---|---|---|---|
| Inventive examples | 1 | 0.45 | 0.09 | 0.12 | 0.04 | 97 | A | B | B | A |
| | 2 | 0.45 | 0.11 | 0.11 | 0.04 | 132 | A | B | B | A |
| | 3 | 0.44 | 0.11 | 0.11 | 0.04 | 132 | A | B | A | A |
| | 4 | 0.45 | 0.11 | 0.11 | 0.04 | 99 | A | B | B | A |
| | 5 | 0.45 | 0.07 | 0.15 | 0.04 | 127 | A | B | A | A |
| | 6 | 0.45 | 0.11 | 0.11 | 0.04 | 132 | A | B | B | A |
| | 7 | 0.45 | 0.11 | 0.11 | 0.04 | 132 | A | A | B | A |
| | 8 | 0.41 | 0.06 | 0.19 | 0.01 | 158 | A | A | B | A |
| | 9 | 0.45 | 0.11 | 0.11 | 0.04 | 132 | A | A | A | A |
| | 10 | 0.45 | 0.11 | 0.11 | 0.04 | 132 | A | A | B | A |
| | 11 | 0.45 | 0.11 | 0.11 | 0.04 | 132 | — | A | A | A |
| | 12 | 0.45 | 0.11 | 0.11 | 0.04 | 132 | — | A | B | A |
| | 13 | 0.14 | 0.08 | 0.20 | 0.04 | 128 | B | B | B | — |
| | 14 | 0.14 | 0.08 | 0.20 | 0.04 | 128 | B | B | A | — |
| Comparative examples | 15 | 0.15 | 0.10 | — | — | 68 | — | C | A | C |
| | 16 | 0.15 | 0.09 | — | — | — | — | A | C | — |
| | 17 | 0.44 | 0.07 | 0.19 | 0.04 | 143 | A | A | C | — |
| | 18 | 0.28 | 0.07 | 0.19 | 0.04 | 143 | A | A | C | — |
| | 19 | 0.44 | 0.07 | 0.19 | 0.01 | 143 | A | A | C | — |
| | 20 | 0.45 | 0.07 | 0.19 | 0.04 | 140 | — | A | C | — |
| | 21 | 0.45 | 0.09 | 4.10 | 0.04 | — | — | — | — | C |
| | 22 | 0.45 | 4.70 | — | 0.04 | — | — | — | — | C |
| | 23 | 0.45 | 0.05 | 5.06 | 0.04 | — | — | — | — | C |
| | 24 | 0.45 | 0.05 | 3.21 | 0.04 | — | — | — | — | C |
| | 25 | 0.37 | 0.07 | 2.45 | 0.04 | — | — | — | — | C |
| | 26 | 0.31 | 0.08 | 0.20 | 0.04 | 143 | — | — | — | C |

As shown in Tables 2 and 3 above, Wire Nos. 1 to 14, which are inventive examples, have wire components within the ranges of the present invention, and thus had excellent evaluation results in terms of the mechanical properties, weldability, and amount of diffusible hydrogen. Although not shown in Table 3, Wire Nos. 1 to 14, which are inventive examples, had excellent creep rupture strength since the Cr, Mo, Co, Nb, V and N contents in the wires are within the ranges of the present invention.

Furthermore, Wire Nos. 1 to 10, which are inventive examples, had excellent evaluation results for the amount of diffusible hydrogen since the F contents thereof are within the preferred ranges of the present invention. Note that although Wire Nos. 11 and 12, which are inventive examples, were not subjected to the evaluation test for the amount of diffusible hydrogen, as Wire Nos. 1 to 10, Wire Nos. 11 and 12 are presumed to have excellent evaluation results for the amount of diffusible hydrogen since they also have a F content within the preferred ranges of the present invention.

On the other hand, since Wire No. 15, which is a comparative example, has a Li content exceeding the upper limit of the range of the present invention, the slag viscosity decreased, and the sagging resistance in the vertical upward fillet welding significantly deteriorated. The remaining of Ti to the weld metal decreased and the tensile strength decreased.

Wire No. 16, which is a comparative example, had a decreased toughness since the Co content in the wire is less than the lower limit of the range of the present invention. As a result of observing the structure of the weld metal, residual $\delta$-ferrite was confirmed.

Wire Nos. 17 and 19, which are comparative examples, had a lowered toughness since the Mg content and the total amount of K and Na in the wires exceed the upper limits of the ranges of the present invention.

Wire Nos. 18 and 20, which are comparative examples, had a lowered toughness since the Mg content in the wires exceeds the upper limit of the range of the present invention.

Wire Nos. 21 and 23 to 25, which are comparative examples, were inferior in the weldability since the $TiO_2$ content in the wires is less than the lower limit of the range of the present invention and the $SiO_2$ conversion value exceeds the upper limit of the range of the present invention.

Wire No. 22, which is a comparative example, had a decreased weldability since the $TiO_2$ content in the wire is less than the lower limit of the range of the present invention.

Wire No. 26, which is a comparative example, had a large amount of spatter and deteriorated weldability since the Mg content in the wire exceeds the upper limit of the range of the present invention.

As described in detail above, according to the flux-cored wire according to the present embodiment, it is shown that even when PWHT is performed at 760° C., a weld metal having excellent strength and toughness can be obtained, and the weldability is also improved.

Although various embodiments have been described above with reference to the drawings, it is needless to say that the present invention is not limited to such examples. It will be apparent to those skilled in the art that various alterations, modifications can be conceived within the scope of claims, and it should be understood that they also justifiably belong to the technical scope of the present invention. Each component in the embodiments described above may be combined arbitrarily in the range without deviating from the spirit of the invention.

The present application is based on a Japanese Patent Application (Patent Application No. 2021-021936) filed on Feb. 15, 2021, the contents of which are incorporated herein by reference.

The invention claimed is:

1. A flux-cored wire for gas-shielded arc welding, comprising:
a flux; and
a steel sheath is-filled with the flux,
wherein the flux-cored wire comprises, based on a total mass of the wire:
Fe: 75 mass % or more and 85 mass % or less;
C: 0.05 mass % or more and 0.25 mass % or less;
$TiO_2$: 3.0 mass % or more and 9.0 mass % or less;
a $SiO_2$ conversion value of metal Si and a Si compound: 0.5 mass % or more and 1.5 mass % or less;
Mn: 0.5 mass % or more and 2.0 mass % or less;
Cr: 8.0 mass % or more and 11.0 mass % or less;
Ni: 0.05 mass % or more and 1.0 mass % or less;
Mo: 0.7 mass % or more and 1.5 mass % or less;
Co: 0.10 mass % or more and 1.50 mass % or less;
Nb: 0.01 mass % or more and 0.15 mass % or less;
V: 0.1 mass % or more and 0.5 mass % or less;
N: 0.015 mass % or more and 0.060 mass % or less;
Li: 0.11 mass % or less;
Mg: 0.85 mass % or less;
a total amount of K and Na: 0.3 mass % or less;
P: 0.020 mass % or less; and
S: 0.020 mass % or less.

2. The flux-cored wire of claim 1, further comprising, based on the total mass of the wire:
Li: 0.01 mass % or more and 0.11 mass % or less,
wherein a $(TiO_2)/(Li)$ ratio is 70 or more and 170 or less, when a content of $TiO_2$ in the wire is expressed as $(TiO_2)$ in mass %, based on the total mass of the wire, and a content of Li in the wire is expressed as (Li) in mass %, based on the total mass of the wire.

3. The flux-cored wire of claim 2, further comprising based on the total mass of the wire:
F: 0.10 mass % or more and 0.60 mass % or less.

4. The flux-cored wire of claim 2, further comprising, based on the total mass of the wire:
$Al_2O_3$: 0.50 mass % or less, and/or
metal Zr and/or a Zr compound, calculated as a $ZrO_2$ conversion value: 0.50 mass % or less.

5. The flux cored wire of claim 2, further comprising, based on the total mass of the wire:
metal A1: 0.20 mass % or less.

6. The flux-cored wire of claim 1, further comprising, based on the total mass of the wire:
F: 0.10 mass % or more and 0.60 mass % or less.

7. The flux-cored wire of claim 6, further comprising, based on the total mass of the wire:
$Al_2O_3$, metal Zr, and/or a Zr compound in 0.50 mass % or less of $Al_2O_3$ and 0.50 mass % or less of a $ZrO_2$ conversion value of metal Zr and a Zr compound.

8. The flux-cored wire of claim 6, further comprising, based on the total mass of the wire:
metal Al: 0.20 mass % or less.

9. The flux-cored wire of claim 7, further comprising, based on the total mass of the wire:
metal Al: 0.20 mass % or less.

10. The flux-cored wire of claim 1, further comprising, based on the total mass of the wire:
$Al_2O_3$, metal Zr, and/or a Zr compound in 0.50 mass % or less of $Al_2O_3$ and 0.50 mass % or less of a $ZrO_2$ conversion value of metal Zr and a Zr compound.

11. The flux-cored wire of claim 10, further comprising, based on the total mass of the wire:

metal Al: 0.20 mass % or less.

12. The flux-cored wire of claim 1, further comprising, based on the total mass of the wire:

metal Al: 0.20 mass % or less.

13. The flux-cored wire of claim 1, comprising the Cr in a range of from 8.0 to less than 10 mass %, based on the total mass of the wire.

14. The flux-cored wire of claim 1, comprising the Cr in a range of from 8.0 to 9.03 mass %, based on the total mass of the wire.

15. The flux-cored wire of claim 1, comprising the $TiO_2$ in a range of from 7.8 to 9.0 mass %, based on the total mass of the wire.

16. The flux-cored wire of claim 1, comprising the Mn in a range of from 0.97 to 2.0 mass %, based on the total mass of the wire.

17. The flux-cored wire of claim 1, comprising the Mn in a range of from 1.07 to 2.0 mass %, based on the total mass of the wire.

18. The flux-cored wire of claim 1, comprising the V in a range of from 0.23 to 0.5 mass %, based on the total mass of the wire.

19. The flux-cored wire of claim 1, comprising the N in a range of from 0.025 to 0.060 mass %, based on the total mass of the wire.

20. The flux-cored wire of claim 1, comprising the N in a range of from 0.030 to 0.060 mass %, based on the total mass of the wire.

\* \* \* \* \*